US006684329B1

(12) United States Patent
Epstein et al.

(10) Patent No.: US 6,684,329 B1
(45) Date of Patent: Jan. 27, 2004

(54) SYSTEM AND METHOD FOR INCREASING THE RESILIENCY OF FIREWALL SYSTEMS

(75) Inventors: Jeremy Epstein, Chantilly, VA (US); Linda Thomas, Reston, VA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/475,943

(22) Filed: Dec. 30, 1999

Related U.S. Application Data
(60) Provisional application No. 60/143,553, filed on Jul. 13, 1999.

(51) Int. Cl.[7] ................................................. G06F 1/24
(52) U.S. Cl. ........................ 713/150; 713/153; 713/200; 713/201
(58) Field of Search ................................ 713/150, 153, 713/200, 201

(56) References Cited

U.S. PATENT DOCUMENTS

| | | | |
|---|---|---|---|
| 5,826,014 A | 10/1998 | Coley et al. | ........... 395/187.01 |
| 5,898,830 A | 4/1999 | Wesinger, Jr. et al. | .. 395/187.01 |
| 6,052,788 A | 4/2000 | Wesinger, Jr. et al. | ...... 713/201 |
| 6,061,798 A | 5/2000 | Coley et al. | ................. 713/201 |

OTHER PUBLICATIONS

J. Epstein, "Architecture and Concepts of the ARGuE Guard," Proceedings of the 15th Annual Computer Security Applications Conference, Dec. 1999.

"TIS Internet Firewall Toolkit Overview"—Advanced Research & Engineering.

Fraser et al., "Hardening COTS Software with Generic Software Wrappers," IEEE Symposium on Security and Privacy, May 1999.

Fiorino et al., "Lessons Learned During the Life Cycle of an MLS Guard Deployed at Multiple Sites," Eleventh Annual Computer Security Applications Conference, Dec. 1995.

"Adaptive Proxy Firewalls—The Next Generation Firewall Architecture" —Network Associates White Paper.

"The Active Firewall—The End of the Passive Firewall Era" —Network Associates White Paper.

Ghormley et al., "SLIC: An Extensibility System for Commodity Operating Systems," USENIX Annual Technical Conference, Jun. 1998.

Mitchem et al., "Using Kernel Hypervisors to Secure Applications," IEEE Computer Security Applications Conference, Dec. 1997.

Goldberg et al., "A Secure Environment for Untrusted Helper Applications—Confining the Wily Hacker," 6th USENIX Security Symposium, 1997.

(List continued on next page.)

*Primary Examiner*—Thomas R. Peeso
(74) *Attorney, Agent, or Firm*—Silicon Valley IP Group, PC; Kevin J. Zilka; Christopher J. Hamaty (57) ABSTRACT

A system and method for minimizing the likelihood of flaws in a firewall proxy is disclosed. Software wrappers are used to introduce fine-grained controls on the operation of existing proxy applications. These fine-grained controls create an extra measure of assurance that bugs (or malicious software) will not subvert the intent of the firewall. To provide even further assurance, the firewall system can be totally wrapped. A totally wrapped system includes a wrapper for the proxies plus a separate wrapper for everything else on the firewall system that can potentially interfere with the wrappers and the proxies. The software wrappers can also be integrated with an intrusion detection system. The fine-grained controls of the software wrapper enables it to be uniquely positioned to generate alerts based on an indication that a flaw exists in the proxy and that the proxy is misbehaving.

29 Claims, 7 Drawing Sheets

OTHER PUBLICATIONS

Amin Vahdat, "Transparent Result Caching," USENIX Annual Technical Conference, Jun. 1998.

Michael B. Jones, "Interposition Agents: Transparently Interposing User Code at the System Interface," Proceedings of the 14th ACM Symposium on Operating Systems Principles, Dec. 1993.

Alexandrov et al., "Extending the Operating System at the User Level: the UFO Global File System," USENIX Annual Technical Conference, Jan. 1997.

Michael B. Jones, "Transparently Interposing User Code at the System Interface," Ph.D. thesis, Carnegie Mellon University, School of Computer Science, Sep. 1992 (Technical Report CMU–CS–92–170).

Kiernan et al., "Preliminary Wrapper Support Interface Specification," TIS Labs Report #0743, Jun. 1998.

Kiernan et al., "Preliminary Wrappers Analysis," TIS Labs Report #0744D, Jul. 1998.

Oostendorp et al., "Preliminary Wrapper Definition Language Specification," TIS Report #0684, Aug. 1997.

SYSTEM AND METHOD FOR INCREASING THE RESILIENCY OF FIREWALL SYSTEMS

The present application claims priority to U.S. Provisional Application No. 60/143,553, filed Jul. 13, 1999, which is incorporated herein by reference in its entirety.

BACKGROUND

1. Field of the Invention

The present invention relates generally to network security, and more particularly, to systems and methods for increasing the security of firewall systems.

2. Discussion of the Related Art

Figure 1:
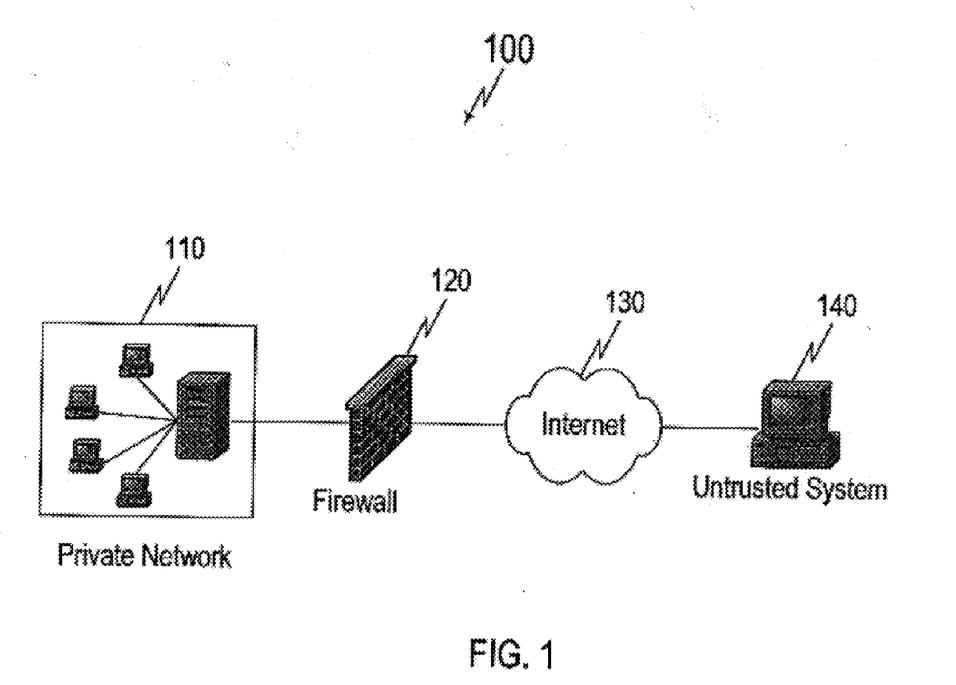
FIG. 1 illustrates a generic network security system.

Firewalls are an essential ingredient in a corporate entity's network security plan. Firewalls represent a security enforcement point that separates a trusted network from an untrusted network. FIG. 1 illustrates a generic example of a network security plan that incorporates a firewall system. In this generic example, firewall system 120 is operative to screen all connections between private network 110 and untrusted system 140. These connections are facilitated by Internet network 130. In the screening process, firewall system 120 determines which traffic should be allowed and which traffic should be disallowed based on a predetermined security policy.

One type of firewall system is an application-level gateway or proxy server, which acts as a relay of application-level traffic. Proxy servers tend to be more secure than packet filters. Rather than trying to deal with the numerous possible combinations that are to be allowed and forbidden at the transmission control protocol (TCP) and Internet protocol (IP) level, the proxy server need only scrutinize a few allowable applications (e.g., Telnet, file transfer protocol (FTP), simple mail transfer protocol (SMTP), hypertext transfer protocol (HTTP)). Generally, if the proxy server does not implement the proxy code for a specific application, the service is not supported and cannot be forwarded across the firewall. Further, the proxy server can be configured to support only specific features of an application that the network administrator considers acceptable while denying all other features.

Application-level firewall proxies are fragile, and are growing ever more complex. Customers demand increasing functionality, including the ability to perform tasks such as virus scanning, limits on addresses visited (e.g., to prevent access to pornographic web sites), and detailed scanning of protocols to prevent outsiders from exploiting vulnerabilities in host systems. As the proxies become increasingly complex, the likelihood of flaws that allow security breaches increase. For example, it is likely that there are opportunities in most firewall proxies for buffer overrun attacks.

As the number of protocols increases, proxies are increasingly written by people without sufficient training in writing safe software. End users want to write their own proxies, since they can do it more rapidly than waiting for a firewall vendor to include a suitable proxy in the product. While both vendors and end users make reasonable efforts to ensure that proxies are not being written by hostile developers (who might insert backdoors or other malicious software), it is likely that such capabilities have been inserted in at least some proxies. Finally, there is significant concern among individuals in government and industry that backdoors are being inserted as a byproduct of Y2K remediation.

Since a single faulty proxy can endanger an entire firewall (and the network behind it), it is important to constrain the damage done by an errant proxy. A conventional approach to such threats would be to use good software engineering techniques (including code inspection), personnel security (such as clearances), and improved testing. However, these approaches are not realistic in today's "Internet time" commercial products environment. Accordingly, what is needed is a mechanism for efficiently increasing the integrity of a firewall proxy.

SUMMARY OF THE INVENTION

The present invention meets the aforementioned needs by minimizing the likelihood of flaws in a firewall proxy. This minimization is achieved through the use of software wrappers that introduce fine-grained controls on the operation of existing proxy applications. This feature enables a network security administrator to prevent bugs (or malicious software) in the proxy from subverting the intent of the firewall.

It is a further feature of the present invention that a firewall can be totally wrapped. A totally wrapped system includes a wrapper for the proxies plus a separate wrapper for everything else on the firewall system that can potentially interfere with the wrappers and the proxies. The result is a system where an attacker who breaks through a proxy may run amok within the system, but will be unable to interfere with the wrappers or the proxies.

In a still further feature of the present invention, the software wrappers of the present invention can be integrated with an intrusion detection system. More particularly, the fine-grained controls of the software wrapper enables it to be uniquely positioned to generate alerts based on an indication that a flaw exists in the proxy and that the proxy is misbehaving.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

A preferred embodiment of the invention is discussed in detail below. While specific implementations are discussed, it should be understood that this is done for illustration purposes only. A person skilled in the relevant art will recognize that other components and configurations may be used without departing from the spirit and scope of the invention.

Application-level firewalls generally are hosts running proxy servers, which permit no traffic directly between networks. A proxy server (sometimes referred to as an application gateway or forwarder) is an application that mediates traffic between a protected network and the Internet. Proxy applications are software components running on the firewall. Proxy applications are often used instead of router-based traffic controls, to prevent traffic from passing directly between networks. Since proxy applications must understand the application protocol being used, they can also implement protocol-specific security. For example, an FTP proxy might be configurable to permit incoming FTP and block outgoing FTP.

Proxy servers are application specific. To support a new protocol via a proxy, a proxy must be developed for it. One popular set of proxy servers is the TIS Internet Firewall Toolkit, which includes proxies for SMTP, Telnet, rlogin, FTP, X-Window, HTTP/Web, and NNTP/Usenet news.

Figure 2:
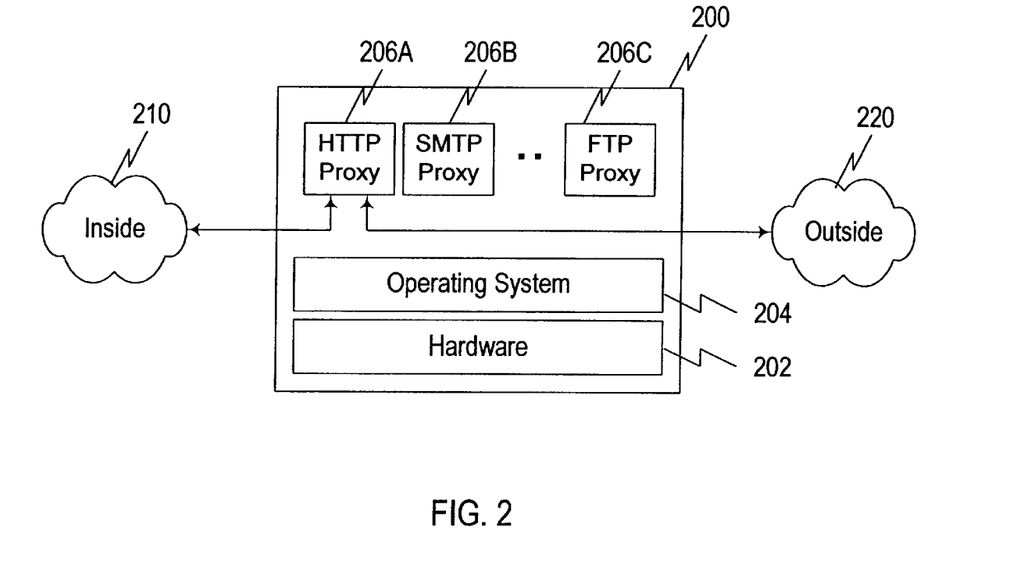
FIG. 2 illustrates an application level firewall.

FIG. 2 illustrates a generic embodiment of a proxy server 200. Proxy server 200 mediates traffic between an inside network 210 and an outside network 220. Proxy server 200 generally includes an operating system 204 (possibly hardened) operating on computing hardware 202. Proxy server 200 also includes a plurality of proxy applications, shown in FIG. 2, including, for example, HTTP proxy application 206A, SMTP proxy application 206B, and FTP proxy application 206C.

Each of proxy applications 206A–C can be custom designed to support the particular security policy of the supported organization. As the security policy becomes increasingly complex and fragmented, so also does the resulting proxy application that embodies the security policy. As the proxy applications become increasingly complex, the likelihood of flaws that allow security breaches correspondingly increase.

Flaws in the proxy can be intentional or unintentional. Unintentional flaws result from a non-proficient or inattentive proxy application developer, while intentional flaws result from a hostile proxy application developer. Regardless of the source of the flaw in the proxy, a single faulty proxy can endanger an entire firewall as well as the integrity of the protected network in which it supports. Constraining the damage done by a faulty proxy is a major concern for any organization.

In the present invention, software wrappers are used to constrain proxies. Software wrapping technology provides a means for including fine-grained controls on the operation of existing proxy applications. These fine-grained controls can prevent bugs (or malicious software) in the proxy from subverting the intent of the firewall.

For example, consider an application proxy based firewall such as the Gauntlet™ firewall developed by Network Associates, Inc. In the Gauntlet™ firewall, proxies are started as root, perform key initialization functions (e.g., binding to low-numbered TCP ports), and then switch to an unprivileged user ID for "normal" operation. However, there are several risks remaining. First, if the proxy contains incorrect code that causes it to perform more than just binding its reserved port before relinquishing root permission, then it could perform arbitrary damage. Second, if the proxy contains incorrect code that causes it to perform incorrect operations that are still allowed with its unprivileged ID, it might disclose information that should be restricted. Finally, if the proxy is vulnerable to buffer overruns, it may be possible to cause it to perform undesired functions (e.g., creating a shell on the firewall machine).

These risks are exacerbated when proxies are written by programmers who are not familiar with the security implications of proxy development. In particular, proxies written by end users (rather than firewall developers) may be more likely to have such flaws.

To minimize the likelihood of flaws, proxies should be protected so that they operate within a restricted subset of available system calls. The ideal subset of calls is the set of system calls used by a proxy. Although the firewall's standard policy is to disallow that which is not explicitly allowed, this probably should not be the method used with system calls. Instead, a wrapper system call classification can be used to allow or disallow entire classes of operations. It should be noted that creating too precise a proxy wrapper can result in the breaking of the proxy either because of previously unseen code paths or because of updated versions of the firewall. In cases where it is unclear from initial analysis whether a call or set of operations should be allowed the wrapper can be designed to allow the operation but log the operation so that subsequent analysis can be done to define a more precise wrapper.

The general idea of software wrapping technology is to provide for relatively small specifications of the allowed behavior of software. The premise of all software wrapping technology is that the application being wrapped should be unaware of the wrapping, and should not need any modifications to be wrapped. Applications may become indirectly aware of wrappers because, as intended, operations that succeed on an unwrapped system may fail on a wrapped system. An example of software wrapping technology is disclosed in Fraser et al., "Hardening COTS Software with Generic Software Wrappers," *Proceedings of the 1999 IEEE Symposium on Security and Privacy*, Oakland, Calif., May 1999.

Figure 3:
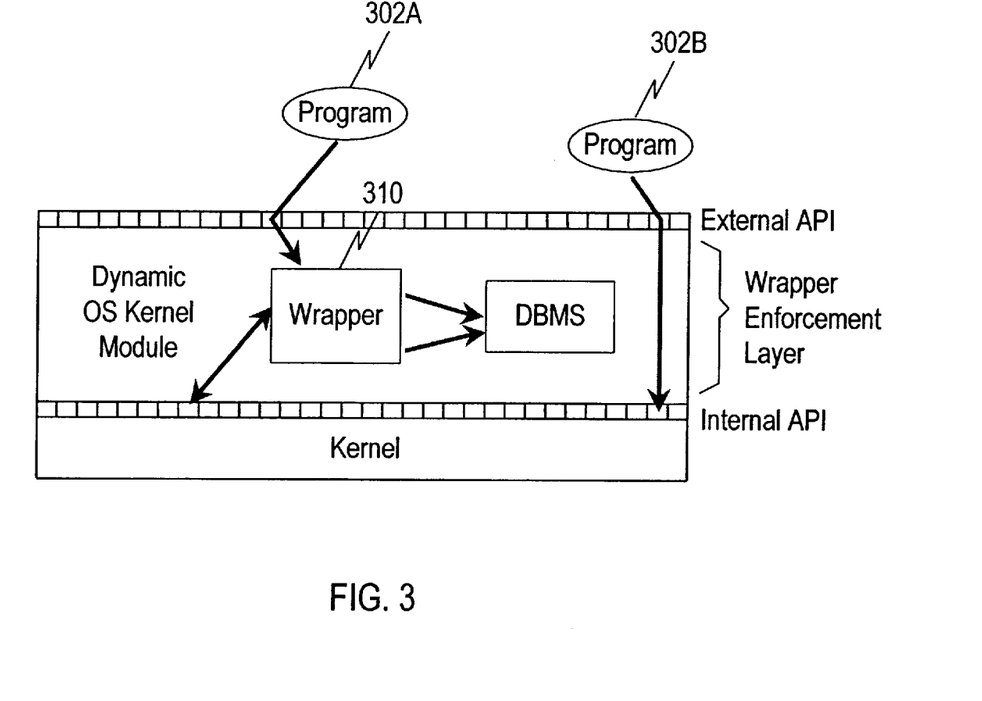
FIG. 3 illustrates the operation of a software wrapper.

FIG. 3 illustrates the operation of a software wrapper 310. Although software wrapper 310 is described in the example context of a UNIX environment, the operation of wrappers and proxies as described below can also be extended to other operating system environments (e.g., Windows NT™).

As illustrated in FIG. 3, operating within the UNIX environment are programs 302A and 302B. Program 302B is an unwrapped program whose system calls pass directly to an internal application programming interface (API). Program 302A, on the other hand, is "wrapped" by wrapper 310. As illustrated, the kernel loadable module intercepts all system calls as they are made by a program 302A, and passes the system calls to wrapper 310 based on criteria (i.e., a wrapper specification (WS)) specified when wrapper 310 is loaded. In this framework, wrapper 310 runs in kernel mode and its execution environment is provided in the kernel loadable module. This execution environment is referred to as the wrapper enforcement layer (WEL).

The WEL tracks running processes and evaluates activation criteria at appropriate times to activate new wrapper instances for processes. These wrapper instances wrap their processes by intercepting some or all of the system calls that are made by the process. This interception effectively puts the wrappers in complete control of their processes' interactions with the operating system and with other processes. For each system call, wrappers can observe and/or modify the parameters specified by the caller and the values returned by the operating system.

A system can have many different WSs loaded, with different activation criteria. For example, a WS might apply to all programs run by a specific user, or to all instances of programs run from a particular directory. As illustrated in FIG. 3, because the interception occurs inside the kernel, the wrappers cannot be bypassed by malicious code.

Having described a general framework for software wrappers, a specific wrapper example, applied to an HTTP proxy, is provided. In this example, various potential system calls generated by an HTTP proxy are described along with corresponding constraints that can be implemented by an associated software wrapper.

First, many HTTP proxies utilize the fork function to create a new process from an existing process. The new process is called the child process, and the existing process is called the parent. While HTTP proxies may need to fork children, HTTP proxies do not need to exec other executables. Accordingly, a software wrapper for an HTTP proxy can include a constraint such that a fork call is okay while an exec call is not.

Second, many HTTP proxies should not need to write to the file system. Preventing file system writes where possible will prevent subverted proxies from damaging the file system. This includes both normal file writing and directory modifying operations such as link, unlink, and rmdir. Accordingly, a software wrapper for an HTTP proxy can include a constraint such that writing to the file system and invoking file system operations such as link, unlink, and rmdir are prohibited.

Third, many HTTP proxies may need to read firewall related configuration files. The HTTP proxies may also need access to certain system-wide configuration files, which are usually in /etc. Even if the HTTP proxies are not running in a chrooted environment, proxies can be restricted to a well-defined set of files they are allowed to read. Accordingly, a software wrapper for an HTTP proxy can include a constraint such that the HTTP proxy can read only from a particular installation directory such as /usr/local/etc.

Fourth, the very essence of a proxy is network I/O. The proxy will therefore need to perform socket-related system calls. Depending on the proxy, it is possible to restrict the ports that the proxy is allowed to access so that the proxy cannot poke extra holes in the firewall. HTTP proxies will typically bind only to a default socket (e.g., 80). Accordingly, a software wrapper for an HTTP proxy can include a constraint such that the HTTP proxy can only bind to the default socket.

Finally, many HTTP proxies do not need most "root" operations even if they are required to run as root. Those proxies that need root-only system calls should be restricted to only the needed calls and the arguments should be validated.

As thus described, software wrappers can be used to ensure the integrity of a traditional proxy. The software wrappers can be defined to varying degrees of granularity depending upon the particular risk or class of risks that is of concern. More particularly, constraining specific forms of behavior of the proxy is based upon the individual specification of activation criteria for the software wrapper.

Significantly, these individual specifications of activation criteria enable the software wrapper to be uniquely positioned to participate as part of an intrusion detection system. In one embodiment, the software wrapper can be designed to generate alerts to an intrusion detection system. This action can occur when the wrapper detects an attempt to invoke a prohibited system call. The invocation of a prohibited system call may be an indication that a flaw exists in the proxy and that the proxy is misbehaving.

As can be appreciated, some system calls are more likely to indicate an attempted subversion. For example, for most proxies an exec call, an attempt to bind ports other than that assigned to the proxy, or an attempt to read /etc/passwd is a sure sign of a break-in attempt, while attempts to read other files may more likely indicate an error in the wrapper. In one embodiment, interfacing with the intrusion detection system is performed by writing records to a log file, and having a user space daemon read the log file and forward the relevant records to the intrusion detection system for processing.

In general, wrappers increase the security of a proxy while also enabling new intrusion detection functionality through the fine-grained analysis and control of proxy behavior. It should be recognized, however, that wrappers are just programs on a computer system. Wrappers are therefore only as secure as their own protection. More specifically, even if a wrapper cannot be directly bypassed, if an attacker can modify or delete the WEL or WSs, then the attacker can subvert the wrapper indirectly.

For this reason, in a preferred embodiment, the firewall system is totally wrapped. A total wrapper includes a WS for the key parts of the system (e.g., for the proxies) plus a separate WS for everything else on the system that can potentially interfere with the WSs, the WEL, and the proxies themselves. The result is a system where an attacker who breaks through a proxy may run amok within the system, but will be unable to interfere with the wrappers or the proxies themselves.

Figure 4:
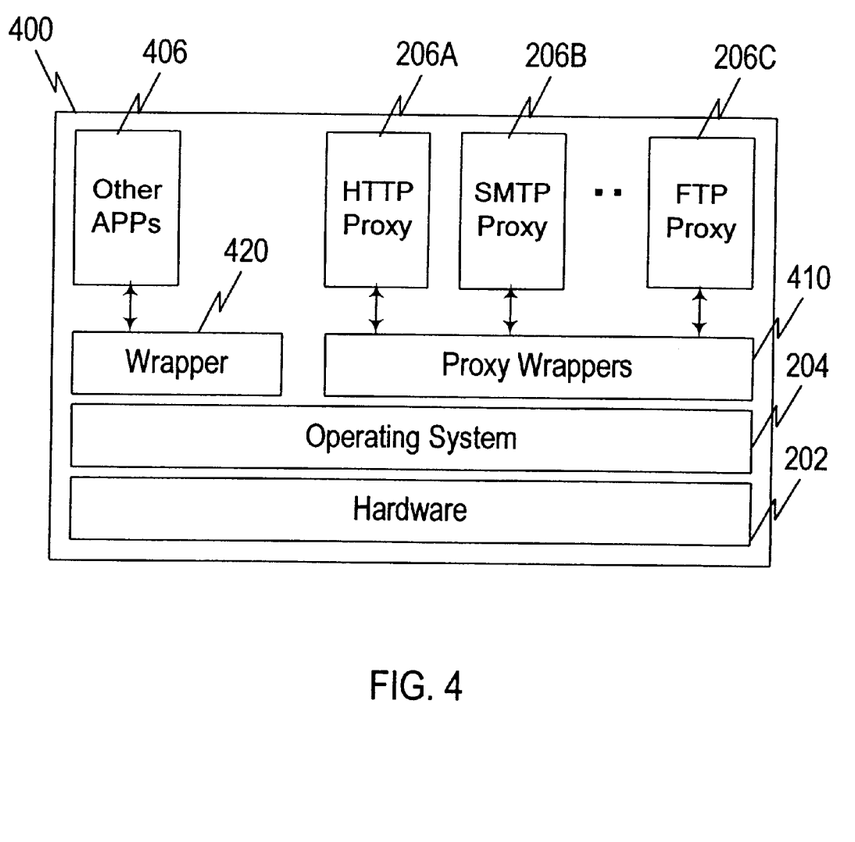
FIG. 4 illustrates a totally wrapped system.

FIG. 4 illustrates an implementation of a totally wrapped system 400. Totally wrapped system 400 includes a set of proxies 206A, 206B, 206C that are wrapped by proxy wrappers 410. As described above, proxy wrappers 410 are operative to constrain elements of behavior of proxies 206A, 206B, 206C. In addition to proxies 206A, 206B, 206C, firewall system 400 also includes other applications 406. These other applications 406 represent all other programs on firewall system 400 that can potentially interfere with proxy wrappers 410 or proxies 206A, 206B, 206C.

The behavior of other applications 406 is constrained by wrapper 420. Wrapper 420 is generally operative to constrain the interaction of other applications 406 with proxy wrappers 410 and proxies 206A, 206B, 206C. These constraints ensure that proxy wrappers 410 and proxies 206A, 206B, 206C will not be modified or subverted by a malicious entity. In addition to preventing other applications 406 from damaging proxy wrappers 410 and proxies 206A, 206B, 206C, the other applications 406 should also be prevented from masquerading as a proxy. In general other applications 406 should be prevented from writing to the proxy executables or performing network I/O specific to the proxy server's behavior.

Wrapper 420 can therefore be viewed as an interference preventer. For example, wrapper 420 can be designed to prevent anyone from binding the ports used by wrapped proxies 206A, 206B, 206C, modifying the WEL, the WSs, the proxy software, the configuration files used by the proxy, and shared libraries used by the proxy, etc. Wrapper 420 can also be designed to constrain those programs with root privilege, limiting them to performing only those operations that will not interfere with wrappers 410.

As noted, traditional proxies will typically allow unlimited communication from the inside network 210 to the outside network 220, and limited communication from the outside network 220 to the inside network 210. Any flaw in the proxy (including subversion) can cause the proxy to provide direct communication from the outside network 220 to the inside network 210.

This traditional proxy is not suitable for highly classified or proprietary networks (e.g., military/defense organization, law firm, financial institution, etc.). These organizations often require access to public "open source" information. Additionally, these organizations need to allow limited subsets of users on the outside to access resources inside the classified or proprietary networks, especially in coalition environments.

Connecting such networks together historically required special purpose guard devices that are designed to prevent information flowing from the inside network (the more highly classified side) to the outside network (the less highly classified side). Guards differ from firewalls in their primary intent. A firewall is mostly concerned with keeping unauthorized users out, while a guard has the additional goal of preventing information on the inside from being sent to the outside.

Conventional guards suffer from several key problems. First, some guards were either built on special purpose operating systems to maximize their resistance to attack (which made them both expensive to obtain and manage), or they were built on weak commercial off-the-shelf (COTS) operating systems (which made them vulnerable to attack). Second, guards that are built for particular applications are generally hard to extend to other uses. Finally, conventional guards require a human to "certify" each piece of data (e.g., E-mail message) to be released from the inside to the outside.

In the present invention, a firewall product running on a COTS operating system is extended to produce an advanced data guard. As will become apparent in the following description, the advanced data guard addresses the above-mentioned limitations of conventional data guards.

It is a feature of the present invention that a data guard possessing reasonable security assurance can be based on COTS products having low cost, flexibility, etc. This feature is realized through (1) building a data guard on a strong firewall platform, (2) adding multi-part proxies that reduce the risks inherent in all firewall proxies, and (3) strengthening the foundation by using operating system level wrappers to constrain the behavior of the proxies. Collectively, this layered defense approach results in an advanced data guard that provides both increased functionality and assurance.

Various firewall products are available on the market today. An example of a commercial firewall product is the Gauntlet™ firewall by Network Associates, Inc. The Gauntlet™ firewall includes several capabilities worth noting. First, Gauntlet™ has a strong pedigree, having been installed in thousands of sites. Although it has never been evaluated for use in multi-level secure (MLS) environments, its ability to withstand attack is understood. Second, as a COTS software product Gauntlet™ is a low-cost solution, running on COTS hardware architectures such as Intel PCs, Sun SPARC, and Hewlett-Packard PA-RISC. Third, existing Gauntlet™ facilities provide many of the necessary features for a guard, including virtual private networks (VPNs), and the ability to block based on IP addresses. Fourth, Gauntlet™ is readily extensible by including a proxy development toolkit (PDK). The availability of existing protocol proxies allows incremental development of the guard. Initially, the guard can use existing proxies (with the limited filtering capabilities they provide), replacing them as more sophisticated filtering proxies become available. Fifth, Gauntlet includes sophisticated management capabilities, including integration with Network Associates' Cybercop™ intrusion detection products.

A firewall product such as Gauntlet™ can be extended in several ways to produce an advanced data guard. These extensions include (1) adding "safer" multi-part proxies for critical protocols, (2) providing "data sealing" capabilities, (3) integrating wrappers technology for constraining incorrect proxy behavior, and (4) providing data and application-specific intrusion detection information.

Figure 5:
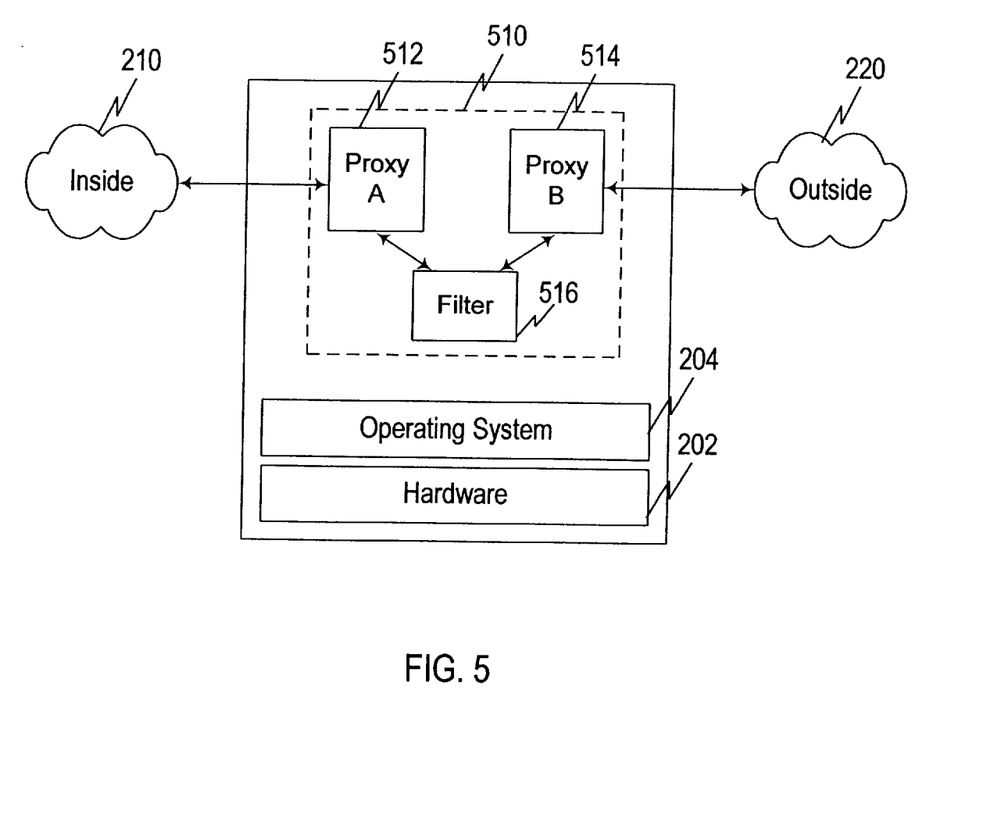
FIG. 5 illustrates an embodiment of a multi-part proxy.

FIG. 5 illustrates the components of a multi-part proxy 510. Generally, multi-part proxy 510 divides the work of a proxy into several programs: one program (proxy A) 512 that communicates with (each) inside network 210, one program (proxy B) 514 that communicates with (each) outside network 220 and one program 516 in the middle that provides for filtering between each combination of inside and outside networks.

Proxy A 512 performs two functions. First, proxy A 512 listens for protocol operations (e.g., IIOP requests or replies) coming from inside network 210 and translates (externalizes) them into files. Second, proxy A 512 listens for the results of content-based filter 516 and translates the externalized files into protocol operations (e.g., IIOP requests or replies). Proxy B 514 performs the analogous function for its attached outside network 220. The content-based filter 516 is operative to review the file created by proxy A 512 or proxy B 514, to perform any necessary content-based decision-making depending on the direction of the transfer, and to forward the request to the opposite side. Content-based filter 516 can also modify the file, thus performing sanitation (e.g., excising profanity or "fuzzing" data values).

The files that are transferred to and from content-based filter 516 are text-based files. In a preferred embodiment, these text-based files include protocol-independent data that can be analyzed and possibly modified by a protocol-independent content-based filter. In a further embodiment, the text-based files are stored in a file using the extensible markup language (XML). Upon the receipt of an XML file, content-based filter can then parse the XML data to find the relevant data to be filtered.

It should be noted that the use of files as the transfer mechanism reduces the binding between the different parts of the system. However, there is no fundamental architectural reason why the connection needs to be based on the use of a file. Accordingly, in an alternative embodiment, shared memory segments are used as the communication method along with appropriate permissions on the shared memory to control which processes can read and write. The use of shared memory also enhances the speed of the transfer mechanism as compared to the file-based embodiment.

It is a feature of the present invention that multi-part proxy 510 is split into smaller proxy components 512, 514, 516. These smaller components enable a network administrator to inspect the components in a piece-wise fashion, as compared to a single large proxy component. This feature increases the maintainability and integrity of the overall proxy.

It is a further feature of the present invention that content-based filter 516 is a protocol-independent analysis tool. This protocol-independent analysis tool can incorporate or be integrated with a variety of existing protocol-independent filtering devices and/or programs. This feature significantly enhances the flexibility and extensibility of the content-based filter 516.

Figure 6A:
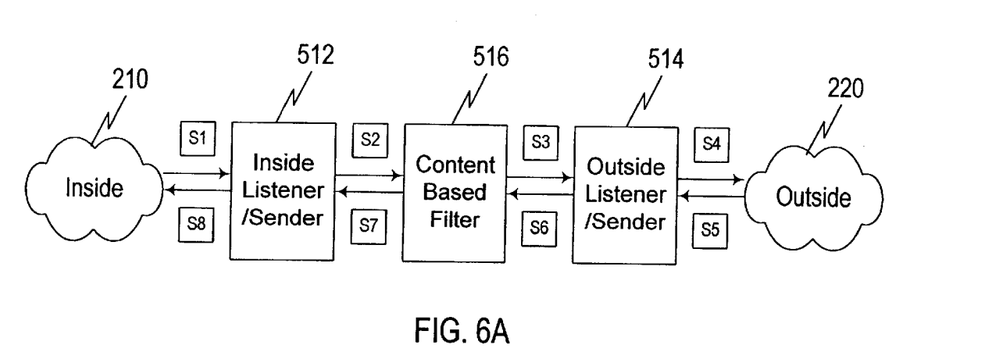
FIGS. 6A and 6B illustrate sequences of successful and unsuccessful protocol operations.
Figure 6B:
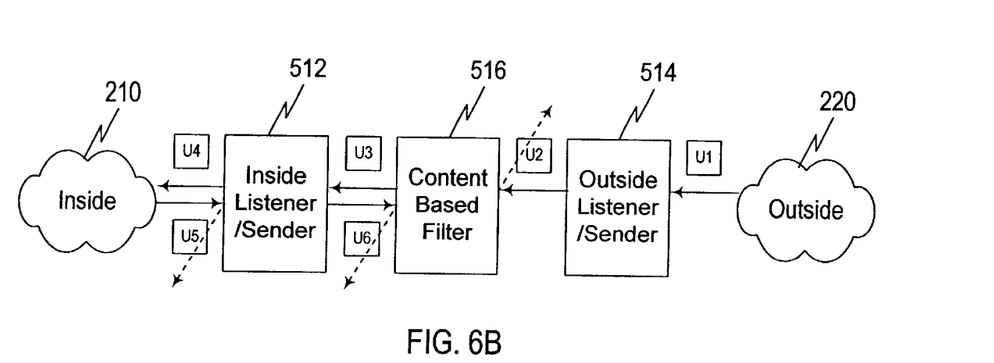

FIGS. 6A and 6B illustrate the sequences for a successful or unsuccessful protocol operation. Consider first the successful sequence of operations in FIG. 6A. The operation starts on the inside network 210, where a client application sends a request (S1) to the inside listener/sender (proxy A) 512. Access controls may be performed at this step before the request is externalized into a file and transferred (S2) to content-based filter 516. Content-based filter 516 makes a decision based on the contents of the request, and forwards the file (S3) to the outside listener/sender (proxy B) 514. The file is then converted from the file format back into the original protocol format, and sent to the server on the outside network 220. When the server responds (S5), the outside listener/sender 514 may perform access controls, and then convert the response to a file. The file continues back through the content-based filter 516 (S6) to the inside listener/sender 512 (S7), where it is converted back into a protocol stream and sent to the originating client.

FIG. 6B illustrates an unsuccessful sequence of operations. This unsuccessful sequence begins on the outside network 220 (although an unsuccessful operation could also begin on inside network 210). In this case, a client application in outside network 220 sends a request to the outside listener/sender 514 (U1), which may perform access controls before converting the request to a file (U2) and sending it to content-based filter 516. After reviewing the contents of the request, content-based filter 516 may reject the request (the dotted line). If the request is not rejected, then content-based filter 516 forwards the request on to inside listener/sender 512 (U3), which converts the file back to a protocol request, and sends it to the inside server (U4). The server's response (U5) is sent to inside listener/sender 512 which may perform access control and reject the response (shown as the dotted line). If the response is accepted, inside listener/sender 512 forwards it to content-based filter 516 (U6), which may also reject the request (the dotted line).

It should be noted that in the unsuccessful scenario, if the response is rejected (at any of the locations shown in FIG. 6B), the client is left waiting for a response. Depending on the application architecture, it may therefore be necessary to generate a synthetic response to the client indicating that the request or response has failed. In some cases it may be sufficient to reject it without indicating whether it was the request or the response that was unsuccessful. In other cases it may be necessary to indicate the cause of the failure. In either case, some information leakage may occur as a result of the synthetic response, so careful definition of the synthetic response is necessary.

Figure 7:
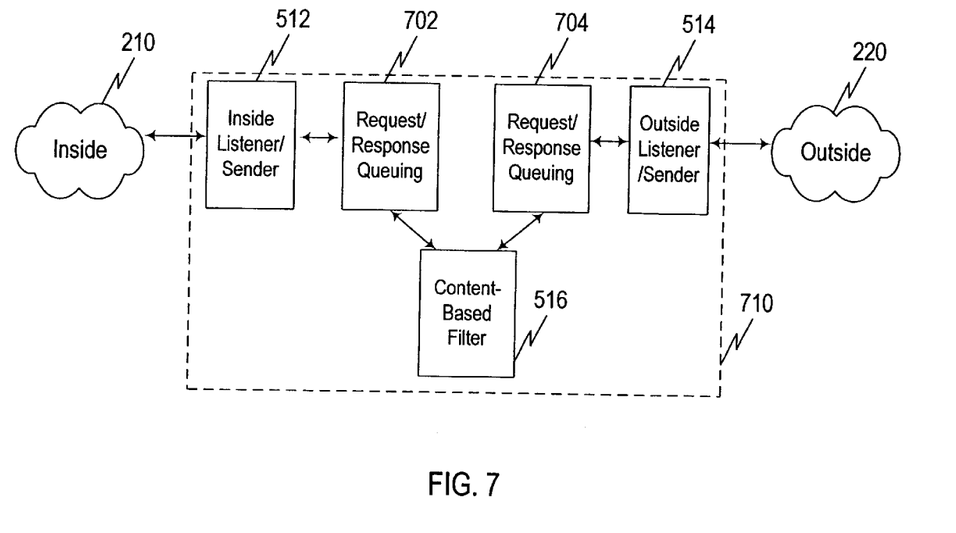
FIG. 7 illustrates a second embodiment of a multi-part proxy.

FIG. 7 illustrates a further embodiment of the guard architecture. In this further embodiment, queuing and dequeuing components 702, 704 are positioned between proxies 512, 514 and content-based filter 516. Each queuing component 702, 704 has an input and an output directory for each transfer direction. Only content-based filter 516 copies files from the input directories to the output directories.

As described, each multi-part proxy 510 can include five parts: the inside listener/sender 512, the inside request/response queue 702, the content-based filter 516, the outside request/response queue 704, and the outside listener/sender 514. Of these five parts, all but the content-based filter 516 are generic for a given protocol. For example, all installations of the data guard which use IIOP as the transfer mechanism will use identical software. Content-based filter 516, however, is highly application specific.

There are two parts to content-based filtering. The first part is to determine what is to be filtered (i.e., the organizational security policy). The second part is to translate those rules into filtering code. The first part is more complicated because organizations frequently do not know what makes data sensitive, especially at the protocol level where the higher level semantics are stripped away. Classified data (i.e., when connecting classified to unclassified networks) presents further complications because few individuals are willing to take the risk of identifying information as unclassified. It is far simpler to claim that all data is classified, thus leading to the traditional unconnected system-high system. Determining what is to be filtered is primarily a social exercise, not a technical one, and as such is outside the scope of this description.

In the present invention, any executable program can be used as a content-based filter 516. Thus, content-based filter 516 could be written in a low level language like C, in a scripting language such as Perl, or in an interpreted language such as Java. Since the filtering is done directly on the boundary controller machine, any vulnerabilities in content-based filter 516 may make it vulnerable to outside attacks. In a preferred embodiment, the Felt language is used to develop content-based filter 516.

The Felt language is developed specifically for filter development. Felt provides constructs for parsing input files into fields and filtering based on content values. Felt can also be extended by writing C code, which can be embedded in the filter definition. While it is nonprocedural (with the exception of C extensions), Felt is still a programming language, and as such, requires significant expertise to write filters. Since filters are application specific, the effort involved in development is a significant cost in fielding a guard, as opposed to the generic parts of the system that can be amortized over multiple instances.

In one embodiment, a graphical user interface (GUI) could be used to present templates to a non-programmer who is knowledgeable about the security constraints. The GUI would enable the non-programmer to fill in the content limitations. The result of the GUI would be a Felt program, which could then be reviewed along with the GUI inputs to verify that it meets the organizational security requirements.

Content-based filter 516 can also be integrated with an intrusion detection system. While proxies 512 and 514 can detect incorrectly formatted protocols (by comparing the data received to the expected protocol), and can send appropriate notifications, content-based filter 516 can be designed to generate application-specific alerts, depending on values received. For example, if data representing the amount of a bank deposit is being passed through data guard 500, an intrusion detection system might be configured as follows:

For deposits less than $1,000, no alert is ever generated.

For deposits greater than $1,000 but less than $10,000 made during banking hours, no alert is generated, but if outside of normal hours then a low level alert is generated.

For deposits greater than $10,000 but less than $100,000, an alert is generated, but the transaction is allowed to go through.

For deposits greater than $100,000 but less than $1,000,000, an alert is generated and the transaction is blocked, but other transactions are permitted.

For deposits greater than $1,000,000, an alert is generated, and future transactions are refused (perhaps because it indicates a significant security breach).

The most interesting alerts are application specific, and hence require knowledge and planning on the part of the filter developer.

A significant intrusion detection issue is where to report the problems. In one embodiment, problems detected by proxy 512 and by content-based filter 516 are reported to devices on inside network 210, while problems detected by proxy 514 (but not content-based filter 516) are reported to devices on outside network 220. This reporting scheme is based on the assumption that attacks on content-based filter 516 are most likely to be attempts to release data that fail the filtering criteria, and are more likely to indicate an error in the program sending the data (or the filter itself) than a concerted effort by an inside user to leak information. As would be appreciated by one of ordinary skill in the relevant art, other variations on this reporting scheme can be implemented by the data guard.

One of the concerns associated with having all of the guard processes on a single platform is that a flaw in any of the processes could lead to undesired results. For example, a flaw in content-based filter 516 or in any one of proxies 512, 514 could allow traffic to flow directly from inside network 210 to outside network 220, thereby bypassing content-based filter 516.

This risk is significant in an environment (e.g., UNIX) that does not provide a thorough access control system. For example, while it is possible to control access to individual files within the Gauntlet™ firewall (which the data guard uses through use of unique UIDs and GIDs to represent each part of the multi-part proxy), there is no means to control which TCP/IP ports may be accessed by an application, other than the restriction that unprivileged processes cannot bind to ports below 1024. Finer-grained controls on the operation of the proxies 512, 514 would therefore be desirable.

In a preferred embodiment, multi-part proxy 710 is controlled through the use of wrappers technology as described above. In a multi-part proxy scenario, there are three wrappers associated with each multi-part proxy 710. A first wrapper is specified for proxies 512, 514. This first wrapper is parameterized such that proxies 512, 514 are allowed to bind to specified TCP/IP ports on the appropriate network interface (i.e., so inside proxy 512 can access inside network 210, and outside proxy 514 can access outside network 220, but not vice versa), and are allowed to access files in its corresponding directories, but not the directories belonging to the opposite side. As would be appreciated by one of ordinary skill in the relevant art, this first wrapper will vary depending on the protocol being processed by the proxy, especially insofar as the port numbers that can be bound.

A second wrapper is specified for the queuing/dequeuing programs 702, 704. The second wrapper is parameterized such that queuing/dequeuing programs 702, 704 are allowed to access the correct directories only, but not allowing them to access any TCP/IP ports.

The third wrapper is specified for content-based filter 516. The third wrapper is parameterized such that content-based filter 516 is allowed to operate on the queuing directories, but is not allowed it to access any TCP/IP ports.

In general, these wrappers are designed to allow the corresponding program to do as little as possible, thereby minimizing the risk of erroneous or malicious code.

In some scenarios, data comes into a system from the outside network 220, is stored, and is then exported back either to its origin or to some other outside organization. In these cases, filtering can be avoided if the data can be recognized as having previously been imported, under the theory that if something came in then it must be acceptable to send it out again.

In the present invention, this concept is implemented by allowing filters to place digital signatures on data items as they transit from the outside network 220 to the inside network 210. An inside-to-outside filter can then verify the digital signature as part of the filtering process, without performing any content-based filtering.

A significant issue of data sealing is determining what to do with the seal data (i.e., the data that makes up the seal itself). Preferably, seals are added to traffic, without changing either the client or server application.

To illustrate this issue, consider the example of CORBA (IIOP) traffic. In one embodiment, the seal is calculated and embedded in a field designated as part of the application definition. It should be noted that in this embodiment, both the client and server applications should be aware of the seal to reserve space for the seal storage. Additionally, the server application should store the seal with the data and retrieve it whenever retrieval is required.

In an alternative embodiment, the seal is calculated in the guard and stored there. Here, neither the client nor the server need be aware of the seal calculation, as it is kept exclusively within the guard. However, the guard should have a mechanism to determine whether a particular piece of data being presented for release has a corresponding seal in the database. In one embodiment, the guard recalculates the seal then searches its database for a previous instance of the seal value. Presuming that the digital signature algorithm is sufficiently strong that collisions are acceptably unlikely, this embodiment will allow release of previously signed data, but will not allow release of unsigned data.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A computer system that implements a security barrier between a first computer network region and a second computer network region, the computer system comprising:

at least one proxy agent running on the computer system, said at least one proxy agent being operative to mediate traffic between a first computer network region and a second computer network region;

at least one first software wrapper application running on the computer system, said at least one first software wrapper application associated with said at least one proxy agent and being operative to constrain at least one element of behavior of said at least one proxy agent; and at least one second software wrapper application running on the computer system, said at least one second software wrapper application being operative to prevent other applications on the computer system from interfering with said at least one proxy agent and said at least one first software wrapper application.

2. The computer system of claim 1, wherein said at least one proxy agent is an application level proxy agent.

3. The computer system of claim 1, wherein said at least one first software wrapper application and said at least one second software wrapper application are kernel loadable modules.

4. The computer system of claim 1, wherein said at least one second software wrapper application prevents other applications from binding ports used by said at least one proxy agent.

5. The computer system of claim 1, wherein said at least one second software wrapper application prevents other applications from modifying said at least one first software wrapper application.

6. The computer system of claim 1, wherein said at least one second software wrapper application prevents other applications from modifying a configuration file used by said at least one proxy agent.

7. The computer system of claim 1, wherein said at least one second software wrapper application prevents other applications from modifying a shared library used by said at least one proxy agent.

8. The computer system of claim 1, wherein said proxy agents and software wrappers can be run on a UNIX operating system.

9. The computer system of claim 1, wherein said proxy agents and software wrappers can be run on a Windows NT operating system.

10. The computer system of claim 1, wherein said at least one first software wrapper application is capable of generating an alert for an intrusion detection system based on an analysis of the operation of said at least one proxy agent.

11. A firewall computer system that implements a security barrier between a first computer network region and a second computer network region, the firewall computer system comprising:
- at least one proxy agent running on the firewall computer system, said at least one proxy agent being operative to mediate traffic between a first computer network region and a second computer network region; and
- at least one software wrapper application running on the firewall computer system, said at least one software wrapper application associated with said at least one proxy agent and being operative to constrain at least one element of behavior of said at least one proxy agent.

12. The firewall computer system of claim 11, wherein said at least one proxy agent is an application level proxy agent.

13. The firewall computer system of claim 11, wherein said at least one software wrapper application is a kernel loadable module.

14. The firewall computer system of claim 11, wherein said at least one software wrapper application prevents said at least one proxy agent from executing a disallowed administrative call.

15. The firewall computer system of claim 11, wherein said at least one software wrapper application prevents said at least one proxy agent from writing to a file system.

16. The firewall computer system of claim 11, wherein said at least one software wrapper application prevents said at least one proxy agent from executing a disallowed file system operation.

17. The firewall computer system of claim 11, wherein said at least one software wrapper application prevents said at least one proxy agent from binding to a disallowed port.

18. The firewall computer system of claim 11, wherein said proxy agents and software wrappers can be run on a UNIX operating system.

19. The firewall computer system of claim 11, wherein said proxy agents and software wrappers can be run on a Windows NT operating system.

20. The firewall computer system of claim 11, wherein said at least one software wrapper application is capable of generating an alert for an intrusion detection system based on an analysis of the operation of said at least one proxy agent.

21. A computer program product for enabling a processor in a computer system to implement a security barrier between a first computer network region and a second computer network region, said computer program product comprising:
- a computer usable medium having computer readable program code means embodied in said medium for causing a program to execute on the computer system, said computer readable program code means comprising:
  - a first computer readable program code means for enabling the computer system to implement a proxy agent, said proxy agent being operative to mediate traffic between said first computer network region and said second computer network region;
  - a second computer readable program code means for enabling the computer system to implement a first software wrapper application, said first software wrapper application associated with said proxy agent and being operative to constrain at least one element of behavior of said proxy agent; and
  - a third computer readable program code means for enabling the computer system to implement a second software wrapper application, said second software wrapper application being operative to prevent other applications on the computer system from interfering with said proxy agent and said first software wrapper application.

22. A computer program product for enabling a processor in a computer system to implement a security barrier between a first computer network region and a second computer network region, said computer program product comprising:
- a computer usable medium having computer readable program code means embodied in said medium for causing a program to execute on the computer system, said computer readable program code means comprising:
  - a first computer readable program code means for enabling the computer system to implement a proxy agent, said proxy agent being operative to mediate traffic between said first computer network region and said second computer network region; and
  - a second computer readable program code means for enabling the computer system to implement a software wrapper application, said software wrapper application associated with said proxy agent and being operative to constrain at least one element of behavior of said proxy agent.

23. A method in a firewall computer system for implementing a security barrier between a first computer network region and a second computer network region, the method comprising the steps of:
- (a) wrapping at least one proxy agent running on a computer system using at least one first software wrapper application, said at least one first software wrapper application associated with said at least one proxy agent and being operative to constrain at least one element of behavior of said at least one proxy agent; and
- (b) wrapping other applications on the computer system using at least one second software wrapper application, said at least one second software wrapper application being operative to prevent said other applications on the computer system from interfering with said at least one proxy agent and said at least one first software wrapper application.

24. The method of claim 23, wherein steps (a) and (b) comprise the step of wrapping using a kernel loadable module.

25. The method of claim 23, wherein step (b) comprises the step of wrapping other applications on the computer system using a wrapper application that prevents other applications from binding ports used by said at least one proxy agent.

26. The method of claim 23, wherein step (b) comprises the step of wrapping other applications on the computer system using a wrapper application that prevents other applications from modifying said at least one first software wrapper application.

27. The method of claim 23, wherein step (b) comprises the step of wrapping other applications on the computer system using a wrapper application that prevents other applications from modifying a configuration file used by said at least one proxy agent.

28. The method of claim 23, wherein step (b) comprises the step of wrapping other applications on the computer system using a wrapper application that prevents other applications from modifying a shared library used by said at least one proxy agent.

29. The method of claim 23, wherein step (a) comprises the step of wrapping at least one proxy agent on the computer system using a wrapper application that generates an alert for an intrusion detection system based on an analysis of the operation of said at least one proxy agent.

* * * * *